US006813044B2

(12) United States Patent
Rylander

(10) Patent No.: US 6,813,044 B2
(45) Date of Patent: Nov. 2, 2004

(54) NARROW BAND, ANISOTROPIC STOCHASTIC HALFTONE PATTERNS AND METHODS OF CREATING AND USING THE SAME

(75) Inventor: Richard L. Rylander, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/462,143

(22) Filed: Jun. 16, 2003

(65) Prior Publication Data

US 2003/0210431 A1 Nov. 13, 2003

Related U.S. Application Data

(62) Division of application No. 09/281,840, filed on Mar. 31, 1999, now Pat. No. 6,606,168.

(51) Int. Cl.⁷ .................. H04N 1/405; H04N 1/409; H04N 1/52; H04N 1/58
(52) U.S. Cl. .............. 358/3.13; 358/3.19; 358/3.2; 358/3.26; 358/533; 358/534
(58) Field of Search .................. 358/3.13, 3.19, 358/3.2, 3.26, 533, 534, 1.9, 3.06, 3.03, 3.05, 3.14, 535, 536, 466; 382/270, 237

(56) References Cited

U.S. PATENT DOCUMENTS

| 5,111,310 | A | | 5/1992 | Parker et al. ............... 358/3.19 |
| 5,341,228 | A | | 8/1994 | Parker et al. ............... 358/534 |
| 5,477,305 | A | | 12/1995 | Parker et al. ............... 358/3.19 |
| 5,543,941 | A | | 8/1996 | Parker et al. ............... 358/534 |
| 5,838,462 | A | | 11/1998 | Ebner et al. ............... 358/534 |
| 6,124,844 | A | * | 9/2000 | Ilbery ........................ 358/3.14 |
| 6,433,891 | B1 | * | 8/2002 | Yu et al. ..................... 358/1.9 |
| 6,501,567 | B2 | * | 12/2002 | Sharma et al. ............. 358/3.19 |
| 2002/0038465 | A1 | | 3/2002 | Okinaka et al. |
| 2002/0071140 | A1 | | 6/2002 | Suzuki et al. |
| 2003/0107768 | A1 | * | 6/2003 | Crounse .................... 358/3.06 |
| 2004/0051907 | A1 | * | 3/2004 | Huang et al. .............. 358/3.06 |

FOREIGN PATENT DOCUMENTS

| EP | 0 647 058 A2 | 4/1995 |
| EP | 0 963 105 A2 | 12/1999 |
| JP | 2001-98617 A | 10/2001 |

OTHER PUBLICATIONS

Rurgathofer et al, "Forced Random Dithering: Improved Threshold Matrices for Ordered Dithering", Proceedings ICIP–94, IEEE Computer Society Press, 1994 vol. 2 of 3, pp. 1032–1035.*

R. Rylander, "Electronic Halftones," presented to "Lasers in Graphics" ca. 1990.

R. Floyd and L. Steinberg, "An Adaptive Algorithm for Spatial Grey Scale," SID Digest, pp. 36–37 (1975).

R. J. Rolleston and S. J. Cohen, "Halftoning with Random Correlated Noise," J. Electron. Imag., 1(2) pp. 209–217 (Apr. 1992).

K. T. Knox and R. Eschback, "Threshold Modulation in Error Diffusion," J. Electron. Imag., 2(3) pp. 185–192 (Jul. 1993).

(List continued on next page.)

*Primary Examiner*—Scott Rogers
(74) *Attorney, Agent, or Firm*—Colene H. Blank

(57) ABSTRACT

A stochastic halftone pattern has been invented which has a narrow band power spectrum due to the incorporation of a dot growth process. The narrow band power spectrum may be matched to the resolution characteristics of specific printers, resulting in smoother printed halftone textures. The spectrum of a halftone pattern may be made anisotropic (angularly dependent), helping to de-couple sets of patterns for color printing with reduced color noise or mottle.

2 Claims, 16 Drawing Sheets

OTHER PUBLICATIONS

R. Stevens, A. Lehar and F. Preston, "Manipulation and Presentation of Multidimensional Image Data Using the Peano Scan," IEEE Trans. on Pattern Analysis and Machine IntelligencePAMI–5, No. 5, pp. 520–526 (1983).

T. Mitsa and K. J. Parker, "Digital Halftoning Technique Using a Blue–Noise Mask," J. Opt. Soc. Am. A9, pp. 1920–1929 (1992).

M. Yao and K. J. Parker, "Modified Approach to the Construction of a Blue Noise Mask," J. Electron. Imag. 3(1) pp. 92–97 (Jan. 1994).

J. Dalton, "Perception of Binary Texture and the Generation of Stochastic Halftone Screens," SPIE Proc. Human Vision, Visual Processing and Digital Display VI, pp. 207–220 (1995).

E. Steinberg, R. Rolleston and R. Easton, "Analysis of Random Dithering Patterns Using Second–order Statistics," J. Electron. Imag. 1(4), pp. 396–404 (Oct. 1992).

M. Broja and O. Bryngdahl, "Quantization of Noise in Electronic Halftoning," J. Opt. Soc. Am. A 10(4) pp. 554–560 (Apr. 1993).

T. Mitsa et al.: "Power–Spectrum Shaping of Halftone Patterns and Its Effect on Visual Appearance," ICASSP–92, IEEE International Conference on Acoustics, Speech and Signal Processing, Mar. 23–26, 1992, San Francisco, California (US), vol. 3, M, Multidimensional Signal Processing; IEEE, New York (US), 1992 pp. III–193—III–196.

\* cited by examiner

Fig. 10c Fig. 10d

Fig. 14a
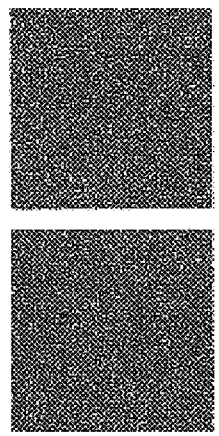 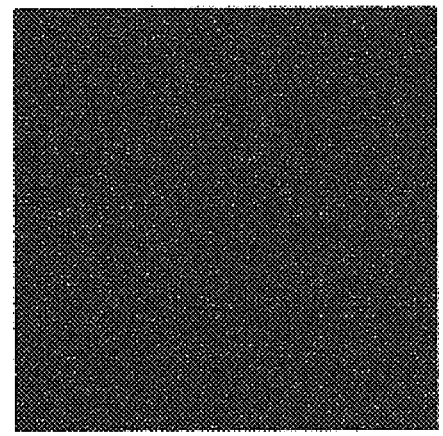
Fig. 14b  Fig. 14c
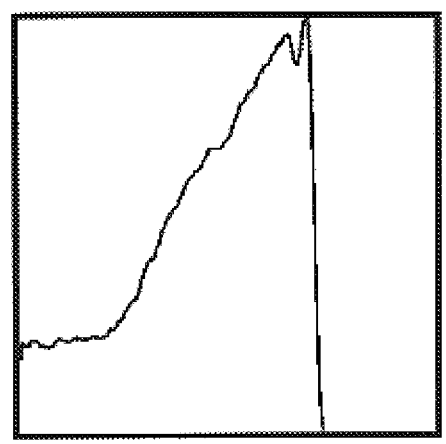
Fig. 14d

Fig. 16a
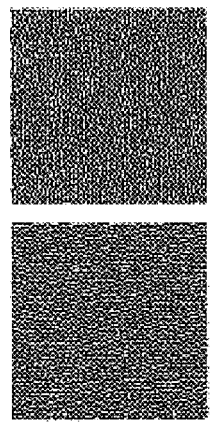
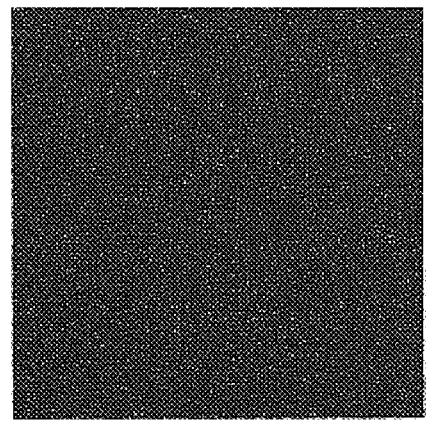
Fig. 16b      Fig. 16c
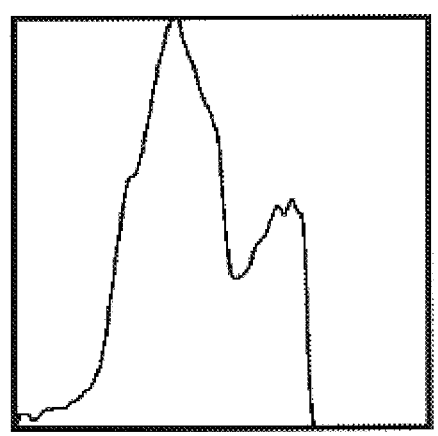
Fig. 16d

Fig. 17a
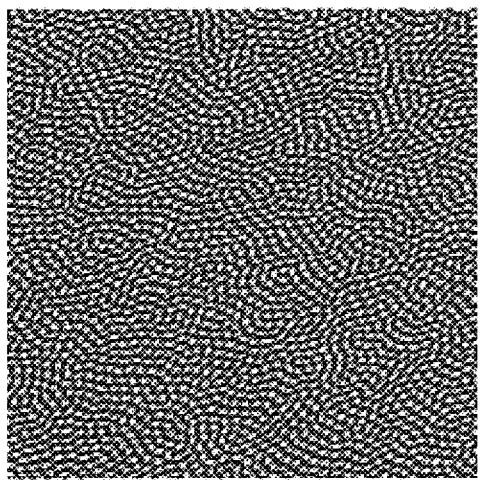
Fig. 17b
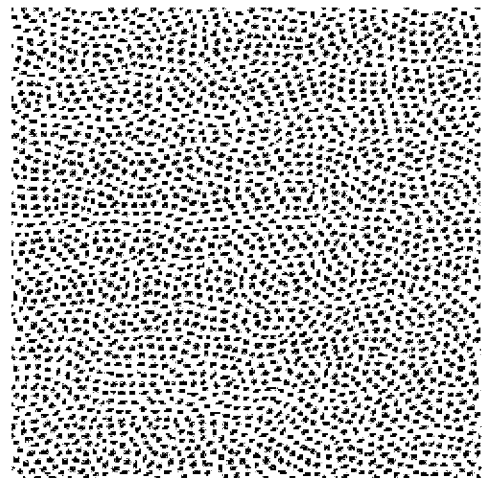
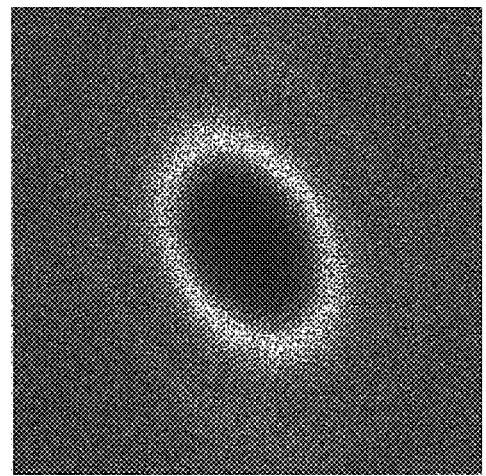
Fig. 17c

NARROW BAND, ANISOTROPIC STOCHASTIC HALFTONE PATTERNS AND METHODS OF CREATING AND USING THE SAME

This application is a divisional of U.S. Ser. No. 09/281,840, filed Mar. 31, 1999, now U.S. Pat. No. 6,606,168.

BACKGROUND OF THE INVENTION

1. Technical Field

The present inventions relates to halftone patterns generally used for printing and image display, and in particular, to stochastic halftone patterns.

2. Description of the Related Art

Most printers (and some displays) are binary—they can either print a fixed-size dot on the paper or not at each point in a discrete array. There is no inherent gray scale capability. See R. Rylander, "Electronic Halftones", presented at the "Lasers in Graphics" conference, ca. 1990, which is incorporated herein by reference.

Virtually all images, on the other hand, contain a continuum of shades from black to white (or a full range of colors). To simulate these varying shades (or colors), binary printers and displays either adjust the size of dots, or adjust the spacing between the dots. Halftone screens are used to determine how large to make the dots or how far apart to space them to represent a particular image.

Most conventional halftone screens use fixed spot positions at a well defined pitch (frequency), and vary the size of the spot to change shade. The high level of periodicity in conventional halftone screens can produce significant moiré or interference effects when an image having strong periodic structures is halftoned, or screens are superimposed for multi-color printing.

Stochastic screens greatly reduce, or even eliminate, this periodicity. Removing the periodicity from the halftone texture in turn greatly reduces the appearance of moiré or interference effects. Moiré effects can also be reduced or eliminated when multiple stochastic halftone screens are combined for color printing.

The term "stochastic screening" can be applied to any halftone process that is aperiodic in nature, producing random or pseudo-random, irregular textures. Most stochastic screens can also be categorized as "dispersed dot" screens, representing different shades by varying the number of isolated, same-size spots per unit area, rather than using different size spots at fixed locations, as with conventional halftone screens.

A widely used form of stochastic screening is the "error diffusion" process introduced by Floyd and Steinberg, (R. Floyd and L. Steinberg, "An Adaptive Algorithm for Spatial Grey Scale", SID Digest, pp. 36–37 (1975)), and the various modifications that have since appeared in the literature. The original error diffusion algorithm was not in itself "stochastic", but completely deterministic. The dot pattern of a halftone raster image was determined by comparing the value of each continuous tone pixel of the input image added to an accumulated error term with a threshold value to make an "all-or-nothing" decision (print a spot at that raster point or not). The difference between the desired shade and the minimum (paper) or maximum (ink) shade actually used is then added to the error term. While the image was generally processed in a strict raster fashion, the errors were not simply pushed into the next raster-order pixel, but given a two-dimensional distribution in a way that produces subjectively pleasing textures for most shades.

Error diffusion produces a dot sequence with shade-dependent duty factor. While some shades correspond to simple duty factors (i.e., a medium gray would be printed as a simple on-off-on checkerboard pattern), most do not, resulting in textures that exhibit locally coherent patterns disturbed by semi-regular phase jumps in the attempt to reconcile some fractional duty cycle with the integer addressability of the raster device. These phase jumps (which look similar to crystal dislocations) make noise-free synthetic (computer-generated) images processed with conventional error diffusion generally unpleasant.

The inevitable low level noise in "natural" (scanned) images adds a randomizing element that suppresses the formation of significant coherent pattern areas. The benefits of intentionally adding low level noise have been recognized in several modifications of the error diffusion technique, making it truly "stochastic". (See R. J. Rolleston and S. J. Cohen, "Halftoning with Random Correlated Noise", J. Electron. Imag., 1(2) pp. 209–217 (April 1992); K. T. Knox and R. Eschback, "Threshold Modulation in Error Diffusion", J. Electron. Imag., 2(3) pp. 185–192 (July 1993)). Other attempts to improve the appearance involve changing the weights or the size of the neighborhood for error distribution, or modification of the raster path through the image (serpentine, peano curve, etc.) (see R. Stevens, A. Lehar and F. Preston, "Manipulation and Presentation of Multidimensional Image Data Using the Peano Scan", IEEE Trans. on Pattern Analysis and Machine IntelligencePAMI-5, No. 5, pp. 520–526 (1983)).

Error diffusion processes have the advantage of being dynamic, capable of adjusting their bit-rate on the fly for an optimal pattern at any shade level. The same dynamic behavior is also a disadvantage, however, in that the processes are causal—they only "know" past pixels. This leads to various hysteresis and edge-related artifacts. In addition, the improvements to the original, fully determinative, technique require additional calculations per point, compromising the performance of what is in its basic form already a relatively slow process.

Very fast halftone processing that produces images with textures similar to error diffusion results can be achieved through the use of a "Blue Noise Mask" (T. Mitsa and K. J. Parker, "Digital Halftoning Technique Using a Blue-Noise Mask", J. Opt. Soc. Am. A 9, pp. 1920–1929 (1992); M. Yao and K. J. Parker, "Modified Approach to the Construction of a Blue Noise Mask", J. Electron. Imag. 3(1) pp. 92–97 (January 1994); U.S. Pat. No. 5,111,310 (Parker et al.); U.S. Pat. No. 5,341,228 (Parker et al.); U.S. Pat. No. 5,477,305 (Parker et al.); U.S. Pat. No. 5,543,941 (Parker et al.)). With this technique, a matrix of threshold values is computed to exhibit a so-called blue-noise spectrum in the Fourier domain. The value of each pixel in an image is then compared to the threshold value in the corresponding cell of the matrix. If it is above the threshold value, it is considered a 1 (solid ink or image dot), and if it is below the threshold value, it is considered a 0 (blank paper or screen). Pixels values matching the threshold value can be considered a 1 or a 0 at the designer's choice, or shifted one way or the other on a random or pseudo-random basis.

With a blue noise mask, the calculation per pixel is just a simple comparison of shade values with corresponding mask values, so printing or displaying an image is quite fast. However, such pre-computed threshold matrices (masks) may not necessarily produce optimal (i.e., "shade-adaptive") textures. The spot distributions must be monotonic (constrained by previous shade textures), but they are anticipatory or non-causal and can produce more spatially isotropic and homogeneous textures that are insensitive to image structures. In addition, generating the blue noise mask with appropriate statistical and visual characteristics as described by Parker et al. is quite complicated, requiring iterative manipulations in the Fourier (spatial frequency) domain for each shade value.

More important, the blue-noise spectrum masks are heavily biased toward high frequencies. The emphasis of high spatial frequencies in dispersed dot patterns is an advantage in minimizing the visibility of halftone textures particularly on low addressability printers (such as ink jet or electrostatic) as long as the printer has sufficient resolution to properly render individual spots. The number of resolvable spots in a unit area is limited by the addressability and by the minimum spot size which an imaging engine, such as a printer or display screen, is capable of making. When the frequencies of the halftone exceed the capability of the engine, the spots blur together, a form of dot gain. The resulting image then in fact emphasizes low frequencies, which is usually highly undesirable as it generates visually obtrusive patterns in the image.

Dalton has suggested the use of a "bandpass" stochastic mask, that is, a mask with a maximum frequency to minimize sensitivity to printer dot gain. J. Dalton, "Perception of Binary Texture and the Generation of Stochastic Halftone Screens", SPIE Proc. Human Vision, Visual Processing and Digital Display VI, pp. 207–220 (1995). However, he provided no information as to how such a screen might be generated or optimized for various printer or display characteristics.

All of the foregoing mask techniques also have problems because they assume perfect registrations between different color separations. In the real world, printers are not perfect, and dots of different colors may have slightly different diameters or slightly different positions from those planned. This can create visually discordant images, which are particularly problematic at high frequencies.

SUMMARY OF THE INVENTION

A new type of stochastic (pseudo-random) halftone pattern has been invented which has a narrow band power spectrum. Preferably when used for multiple color separations, the spectrum also is made anisotropic (angularly dependent). The narrow band property helps control dot gain (resulting in smoother textures), and the anisotropy may be used to de-couple sets of patterns for color printing with reduced color noise or mottle.

According to the present invention, a new approach is used to generate a halftone threshold matrix. The generation process is a means of ranking (assigning threshold values to) the elements of the threshold array to determine which dots will be printed in a corresponding halftone image to simulate a given shade of gray. Since the dot pattern is to be stochastic, or pseudo-random, in appearance, the threshold matrix is generally very large, e.g., a two-dimensional array of 256×256 elements. In addition to the threshold matrix itself, an auxiliary matrix of the same size is defined that will be used to store an "accumulated bias" measure.

An arbitrary element of the threshold matrix is assigned the lowest rank threshold value (the rank will range from 0 to 65535 for the 256×256 element matrix used to illustrate this description). The elements of the auxiliary "accumulated bias" matrix are then assigned bias values calculated by a formula based on the distance of each element from the corresponding ranked threshold matrix element. The bias value formula has a behavior which is "repulsive" for large element distances, and "attractive" for short distances.

The element of the threshold matrix which will be assigned the next sequential rank is determined by searching the corresponding "accumulated bias" matrix for the element with lowest bias. As each threshold matrix element is ranked, the bias values based on distances to the new element are added to the previous values in the "accumulated bias" matrix. The large-distance repulsive behavior of the bias formula ensures that initially, the ranked elements of the threshold matrix will be as mutually far apart as possible.

As the ranking process progresses, the mean distance between ranked elements of the threshold matrix decreases. At some point, this mean distance falls to a level where the short-range "attractive" behavior of the bias function takes over and accumulated bias minima will be found adjacent to previously ranked element locations rather than between them. That is, existing dispersed dots will begin to grow.

An example of a bias value formula that shows this behavior would be:

$$f(d) = \frac{a + bd^2}{a + d^4}$$

with a and b representing constants selected to optimize the threshold matrix for the particular imaging engine (printer or display) with which the matrix will be used, and where d represents the distance from the element for which the bias is being calculated.

The ranking process continues until all elements of the halftone threshold matrix have been assigned a value. Since the range of rank values will generally greatly exceed the number of shades to be approximated (digital images typically are quantized to 256 discrete shade levels), a mapping process is applied to scale the threshold matrix values to the desired shade range. This mapping process will result in multiple elements of the threshold matrix having the same value—at each shade step more than a single dot will be added to the halftone pattern. The mapping process can be nonlinear to correct for dot gain or other non-ideal behavior of the printer.

In most circumstances, an image will have more than 256×256 pixels, so this grid would be replicated to create a large enough matrix to cover the entire image. Since this is expected, normally it should be assumed that the grid is replicated, and the elements in at least part of the first ring of replicas should be included when making the accumulated bias calculation. This is particularly significant since failure to do this will result in edge effects, with the cells along each of the matrix inherently having a lower bias without the replicas then they would with the replicas.

The foregoing creates a deterministic matrix, which sometimes creates artifacts in the image display. Preferably, the matrix is made truly stochastic, by jittering the placement of at least the first portion of the elements. If the formula indicates that a particular element has the lowest bias, instead of ranking that element, an adjacent element is ranked, thereby introduce a slight jitter. It usually is not necessary to jitter all elements in a matrix—the randomness introduced by jittering the first three to ten percent will affect all remaining element selections, so that usually is sufficient.

Any formula meeting the characteristics described above (a "repulsive" component acting over longer distances and an "attractive" component acting over shorter distances) will have some characteristic transition spatial frequency where the behavior changes. This frequency can be tuned by modifying the formula, e.g., by changing the values of the constants a and b in the preferred formula. At the same time, any particular imaging engine (printer or display) has a maximum frequency it is actually capable of reproducing, which is the passband frequency of the engine. Preferably, the frequency in the formula is tuned so that it is just within the passband frequency of the imaging engine. This will maximize the resolution of the image, while minimizing dot gain.

The threshold matrices resulting from this technique will produce halftone patterns with characteristics that correspond to a circular ring in the Fourier domain and a power spectrum which is low at low frequencies, peaks at the mid-range characteristic frequency previously described, and low to moderate at the higher frequencies.

All of the above is for a single grayscale matrix. Color printers usually operate by having multiple color separations, with the grayscale matrix applied separately to each color separation, e.g., Cyan, Magenta, Yellow, Black. If identical matrices are used, any inaccuracies in the registration of printing or displaying the different colors will be quite obvious. The present invention therefore further provides means to minimize these effects by using a different matrix for each color.

The matrix can be made different by using a different arbitrary starting cell, or preferably, by changing the circular bias to an elliptical bias. This can be done by changing how the formula calculates the distance to the other elements. Instead of the true linear distance d, a coordinate transformation is applied to the values in the x and y directions (e.g., so that the x component of the distance contributes more than the y component). One preferred embodiment uses a scaling factor of s*x for the x dimension, and y/s for the y direction. The distance d used in the formula then is the square root of the sum of the squares of these two elements.

The result then is a pattern having an elliptical, rather than a circular, ring in the Fourier domain, i.e., it is anisotropic. By using a variety of scaling factors or changing the coordinate system, the major axis of the ellipse for each separation can be at a different angle.

The overlap of such directionally biased (anisotropic) arrays does not vary as much with mis-registration of the different separations it does with isotropic arrays. The result is that mis-registration becomes much less noticeable, and the resulting image is more pleasing to the eye.

The threshold matrices generated by this process then preferably are included in the usual printer drivers, and used with an image the manner of any threshold matrix. That is, the value of each pixel of an image is compared to the threshold value in the corresponding element in the mask, converted to a 1 if it is above the threshold, 0 if below, and arbitrarily to 1 or 0 if it equals the threshold.

BRIEF DESCRIPTION OF THE DRAWINGS

The preferred embodiments of the present invention will be described in greater detail with reference to the following drawings:

FIGS. 10a, 10b, 10c, 10d (collectively, FIG. 10) illustrate various characteristics of the unrestricted stochastic threshold matrix used to produce the halftone pattern of FIG. 5.

FIGS. 14a, 14b, 14c, 14d (collectively, FIG. 14) illustrate the result of overprinting two unconstrained stochastic halftone patterns of the type illustrated in FIG. 5.

FIGS. 16a, 16b, 16c, 16d (collectively, FIG. 16) illustrate the result of overprinting two unconstrained stochastic halftone patterns of the type illustrated in FIG. 11.

FIGS. 17a, 17b, 17c (collectively FIG. 17) are an illustration similar to FIG. 15, with the anistropy at a different angle.

DETAILED DESCRIPTION OF THE PREFERRED EMBODIMENTS

The present invention creates and uses a bandpass stochastic halftone pattern. At relatively larger distances, a repulsive bias, e.g., an inverse square bias, has the dominant effect, while at shorter distances, an attractive bias, e.g., a squared or parabolic bias, has the dominant effect. The result is an overall bias that is generally an inverse square bias, but with bandpass or narrow band (a more fitting description, based on the spectral characteristics) characteristic. The resulting stochastic halftone patterns are very robust, showing little change in gain or visual noise characteristics as the printed spot size varies.

Figure 1:
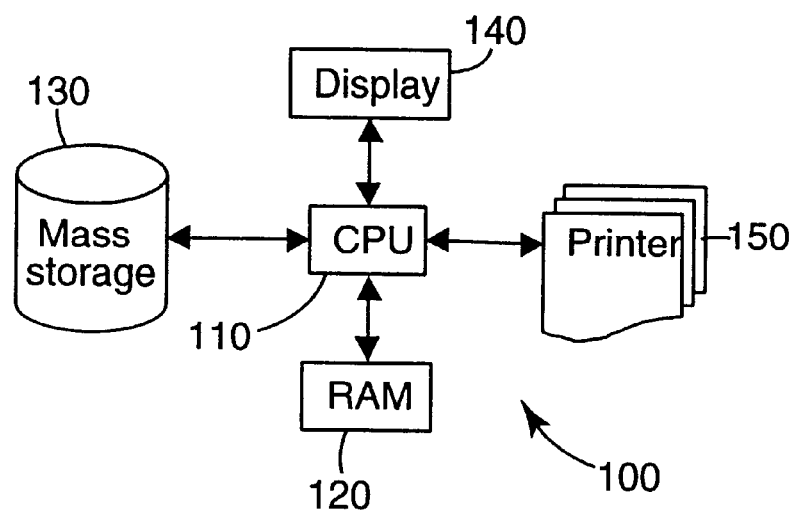
FIG. 1 is a schematic representation of a computer system for implementing the present invention.

Referring to FIG. 1, the typical mask will be created and used by a computer 100, having a central processing unit (CPU) 110, random access memory (RAM) 120, mass storage device 130 (such as a hard drive, CD-ROM drive, diskette drive or the like), a display 140 (such as a cathode ray tube, LED, LCD or plasma display) and a printer 150 (such as a dot matrix printer, a laser printer, or an ink jet printer), associated such that the CPU can read and write to the RAM 120 and the mass storage device 130, can control the images on the display 140 and the output of the printer 150.

Figure 2:
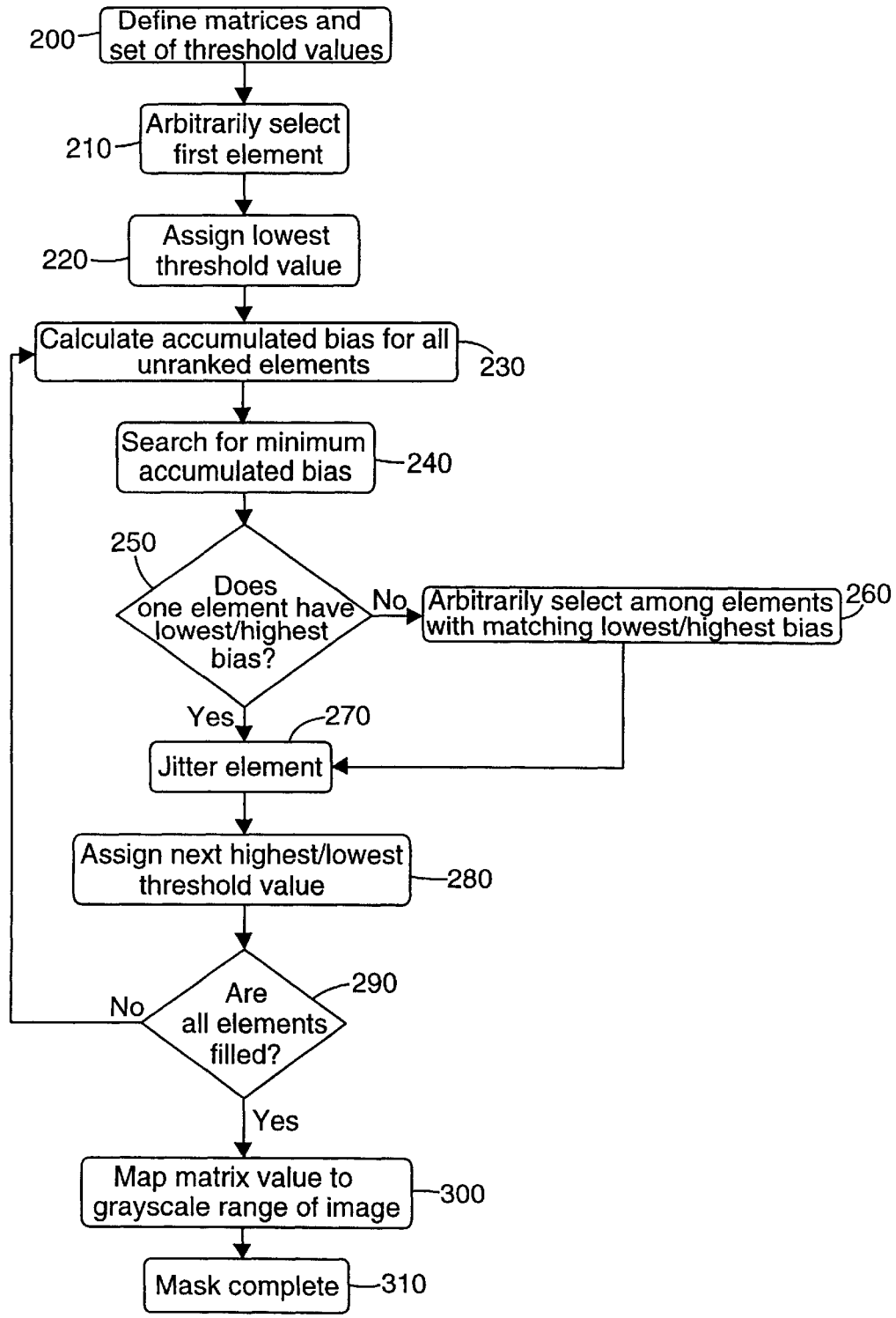
FIG. 2 is a flow chart representing a method of generating a threshold matrix according to the present invention.

To create the mask, the CPU 110 follows the steps generally laid out in FIG. 2. First, in step 200, the CPU 110 defines a threshold matrix of elements, e.g., a 256×256 matrix, in the RAM 120 or on the mass storage device 130 and a set of threshold values at least as large as the number of elements in the matrix, e.g., 0 to 65535. Preferably, the CPU 110 also defines an accumulated bias matrix of matching size, having a set of initial values, e.g., 0.

In step 210, the CPU 110 arbitrarily selects a first element in the threshold matrix, e.g., by use of a pseudo-random number generator, and in step 220, ranks (fills) it with the lowest value (0) in the set of threshold values.

Next, in step 230, the CPU 110 calculates the accumulated bias for each remaining unfilled element. It does this by calculating and summing for each unfilled element the value of a bias formula which defines a bias created by each other element in the matrix. The formula will be describe in more detail below. Preferably, this is done by keeping a running total of the effects of each newly ranked element in each element each element in the accumulated bias matrix the bias effects of the newly ranked element, thereby minimizing recalculation.

Preferably, in calculating the accumulated bias, the CPU 110 assumes the matrix is replicated around itself at least horizontally and vertically, and incorporates the values of the bias caused by the elements in these replica matrices in the summation for each unfilled element. If the bias formula has a sufficiently rapid fall-off with distance, e.g., an inverse square bias, it is not necessary to calculate the value of all of the elements in the replica matrices. It is sufficient to calculate the effects of the elements approximately one matrix width (256 elements, in the example) in any direction away from the element for which the bias is being calculated.

In step 240, the accumulated bias for all unfilled elements are compared, and the element(s) with the lowest value identified. The CPU 110 then determines in step 250 if more than two or more elements have the same accumulated bias. If not, the element with the lowest bias is selected. If two or more elements have the same accumulated bias value, one of them is selected arbitrarily, e.g., by use of a pseudo-random number generator, in step 260. The CPU 110 then proceeds to optional step 270 (jittering the element), and will be discussed separately below. The thus selected (and possibly jittered) corresponding threshold matrix element is then ranked with the next lowest value in the set of threshold values, e.g., 1, in step 280.

In step 290, the CPU 110 checks to see whether all elements in the threshold matrix have been ranked. If not, the CPU 110 returns to step 230 and repeats the process of calculating the accumulated bias and assigning a threshold value until each remaining unfilled element is ranked.

Any real-world halftone process must contend with the non-ideal characteristics of printers or other output devices. Compensation for tone reproduction curve (TRC) nonlinearities, or subjective contrast adjustments are fairly easy to incorporate into stochastic threshold matrices generated by this method. Once all elements in the threshold matrix have been ranked, the CPU 110 proceeds in step 300 to map the ranked values to useful threshold values taking such considerations into account.

The 256×256 element threshold matrix described here can potentially represent 65536 shades (the range of rank values assigned during the generation process). Most image data, however, contains only 256 shades per channel. The original threshold matrix values should be mapped into the image shade range so that the on/off state of each printed spot can be determined by simple comparison.

A simplistic approach to this mapping would be to divide each original threshold matrix value by 256 and take the integer part of the result. This creates redundancies with many threshold array elements being given the same value, each shade increment would then change the number of dots in the halftone pattern by 256. Dot gain effects and other nonlinearities, however, would virtually guarantee the printed output would show non-uniform shade steps.

A preferred approach is to print a test image with samples of shades that would be produced by the simplistic method above, measure the actual printed densities, then use the data to derive a nonlinear mapping function that will compensate for non-ideal printer characteristics. The correction may be done analytically, by finding a best-fit curve through the test image data points, then mathematically inverting the function describing the curve, or numerically (through manipulation of tables).

A non linear mapping function will then produce a final threshold matrix where the number of dots added to a halftone pattern per shade step will not be a constant, but will vary in such a way that the perceived printed shade steps will be uniform (or show some other desired contrast behavior).

Once this mapping is completed, the final threshold matrix is complete in step 310, and is saved to non-transient storage, e.g., the mass storage device 130. It may also be incorporated into a printer or display driver or similar software or its equivalent hardware to use the matrix.

Figure 3:
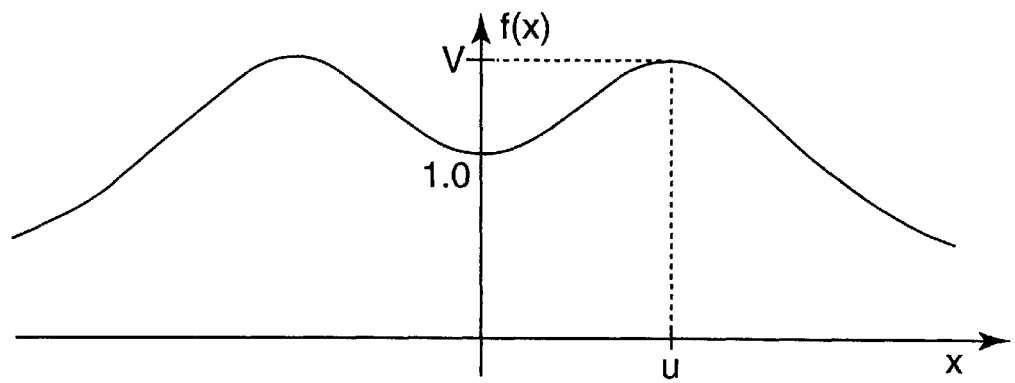
FIG. 3 is a graph of a preferred formula for calculating bias according to the present invention.

The formula used to calculate the accumulated bias preferably has a first component which applies a "repulsive" bias over relatively larger distances and an attractive bias over relatively smaller distances. As suitable formula would be:

$$f(d) = \frac{a + bd^2}{a + d^4}$$

with a and b representing constants selected to optimize the matrix for the imaging engine (printer or display) with which the matrix will be used, and where d represents the distance from the element for which the accumulated bias is being determined to each previously ranked element. A graph of the formula is shown in FIG. 3.

This function approximates an "inverse square bias" (repulsive) at large distances:

$$\lim_{d \to \infty} f(d) = \frac{b}{d^2}$$

and the close-range behavior is that of an offset, scaled parabola (attractive):

$$\lim_{d \to 0} f(d) = 1 + (b/a) d^2$$

The derivative of this potential function is given by:

$$f'(d) = \frac{-2d(bd^4 + 2ad^2 - ab)}{(a + d^4)^2}$$

$f'(d)=0$ at the local minimum when $d=0$, and at the maxima when $d=\pm u$, where:

$$u^2 = \frac{\sqrt{a^2 + ab^2} - a}{b}.$$

This produces a local minimum value $f(d)=1$, and a maximum value:

$$f(\pm u) = v = \frac{b^2}{2(\sqrt{a^2+ab^2}-a)}.$$

Given a desired local maximum point (u,v), this means $$a = \frac{u^4 v}{v-1}, \quad b = 2u^2 v.$$

However, this is more flexibility than necessary, since the transition from repulsive behavior (where spots are added between existing spots) to attractive behavior (where spots are added at the edges of existing [clusters of] spots, a dot-growth process) depends primarily on the position of the maximum "u", not its magnitude "v". This means that if we set b=√a so that $$f(d) = \frac{a+\sqrt{a}\,d^2}{a+d^4}, \text{ then}$$

$$\lim_{d\to 0} f(d) = 1 + \frac{d^2}{\sqrt{a}}, \text{ and}$$

$$\lim_{d\to\infty} f(d) = \frac{\sqrt{a}}{d^2}.$$

The maximum value v then becomes a constant (independent of a):

$$v = \frac{1}{2(\sqrt{2}-1)} \approx 1.2071.$$

The maxima occur at x=±u, where $u^2 = \sqrt{a}(\sqrt{2}-1)$.
Given a desired maximum location u, then $$a = \frac{u^4}{3-2\sqrt{2}}$$

It is this maximum location parameter u that may be varied to optimize a halftone pattern for a given printer or display. As shades progress from white through the brightest highlight values, the halftone textures develop as in a "normal" stochastic screen where spots are added between existing spots in a pseudo-random, but visually homogeneous pattern. At a shade value that depends on u (that is, when the mean spot-to-spot distance reaches a certain critical value), the attractive nature of the potential takes over and existing spots begin to grow (as "dots" or spot clusters). This growth process maintains a very consistent mean dot-to-dot distance, $\bar{d}$, that is independent of the shade value until the very darkest shadows are reached and the smallest holes begin to disappear.

As a general guide, the mean dot-to-dot distance should be slightly more than the spot size of the printer or display serving as the imaging engine. The relationship between the parameter a and the mean dot-to-dot distance, $\bar{d}$, is very linear. Taking into account overlapping potentials from multiple bias contributions in a two-dimensional distribution, we find $\bar{d} \approx 2.59 * a$.

The process just described creates a deterministic, non-stochastic matrix. Such a matrix tends to have problems with developing regular patterns, which are obtrusive in the image. Therefore, the process of generating the matrix preferably includes step 270, perturbing or jittering an element.

There are several options as to how the bias process might be perturbed or jittered to produce a "stochastic" threshold matrix. The bias matrix itself can be made noisy by adding properly scaled random numbers to each element. The symmetry of the bias matrix can be broken by adding small positional offsets to the x and y coordinates of its elements. Most effective, however, is to "jitter" the location of the element being filled. That is, once the unranked matrix element with minimum accumulated bias has been found, the actual element selected and ranked can be randomly or pseudo-randomly chosen from the unranked candidates in a small neighborhood surrounding the true minimum. If reasonable parameters are used (e.g., additive random number magnitudes should not overwhelm normal bias values, jitter neighborhoods should be small compared to the overall matrix size), the perturbations only affect the fine structure of the halftone patterns. The resulting texture at any shade will be quite homogeneous without large-scale voids or clumping and the inter-spot distances will be reasonably constant (the variance of this distance being controlled by the jitter magnitude).

Several perturbation methods may be combined or used "dynamically". It is particularly useful to vary the jitter neighborhood as shade level drops and the mean inter-spot distance decreases.

It generally is not necessary to jitter every element (which would become increasingly difficult as the matrix fills). The randomness introduced by jittering the first three to ten percent, and preferably the first five percent, of the elements will be carried over into the bias calculations for the remaining elements, and usually is sufficient.

The visual characteristics of stochastic halftone patterns can be explained by examination in the Fourier (spatial frequency) domain. The Fourier representation is computed as a radially averaged power spectrum. This was introduced by Ulichney as a convenient one-dimensional metric to compare various aperiodic halftone results since the patterns described so far should not exhibit any directional bias (other than the influence of the raster alignment of addressable spots). (See R. A. Ulichney, Digital Halftoning, MIT Press, Cambridge, Mass. (1987).)

Figure 4:
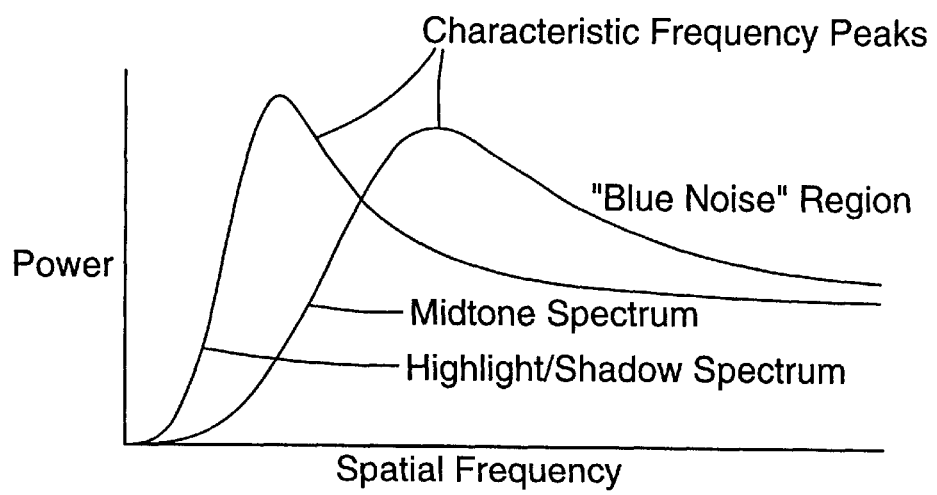
FIG. 4 is a graph of a representative idealized spectrum for halftone patterns.

An idealized spectrum of what Ulichney would consider a well-formed dither pattern shown in FIG. 4 for highlight and midtone shade cases. There is relatively little spectral energy at low spatial frequencies, a characteristic frequency peak that is shade-dependent, and an extended high frequency "blue noise" region. The characteristic frequency in terms of the basic raster frequency, $f_{raster}$, is given by $$f_{characteristic} = f_{raster}\sqrt{\frac{1}{2} - \left|s - \frac{1}{2}\right|},$$

where s is the normalized shade (0=black to 1=white) or the average fraction of ideal black spots to total addressable points (the absolute value of the difference from ½ makes the characteristic frequency symmetric in the 0 to 1 interval with a maximum at the midpoint shade s=½).

Figure 5:
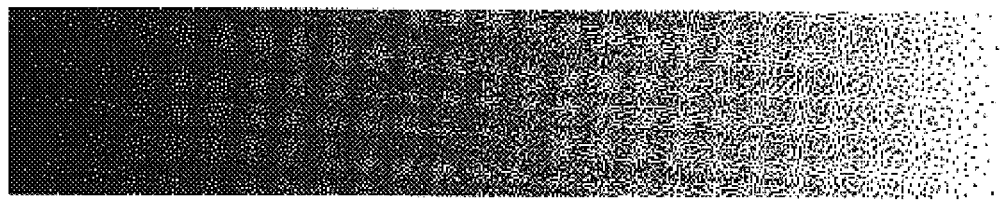
FIG. 5 is a typical halftone pattern using a blue noise spectrum.
Figure 6:
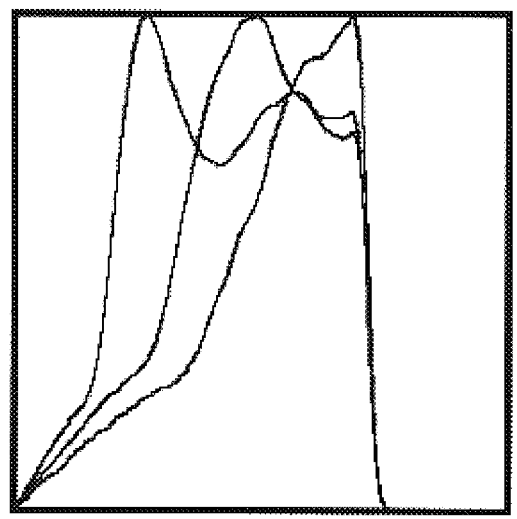
FIG. 6 is a graph of measured spectra of the pattern of FIG. 5, where the horizontal axis represents the frequency, and the vertical axis represents power.

A typical pattern produced using a blue-noise technique is shown in FIG. 5. FIG. 6 then shows the measured spectra for a few sample shades of the stochastic pattern shown in FIG. 5 (the power spectrum calculation always normalizes the peak value to unity in these graphs). The spectra were calculated from 256×256 pixel shade samples, producing 256×256 element Fourier transforms (with the zero frequency [DC component] origin in the center). The radial averaging process then has an upper frequency limit of 128

√2≈181 (the length of a frequency domain diagonal from the center to a corner) where the spectra all drop to zero. The left-most line in the graph in FIG. 6 is for a highlight shade (240, where white=255) and the right-most line in the graph is for middle gray (128).

These spectral characteristics would be desirable if printers produced perfect, unit area spots. Antique dot matrix (wire impact) printers came much closer to this ideal than modern ink jet or laser printers, which print disk shaped dots that often are larger in diameter than the addressibility step for the printer. The consequences of printing with a spot larger than the addressability step size include increased dot gain (which can be compensated for) and irreversible modification of the power spectrum.

Figure 7A:
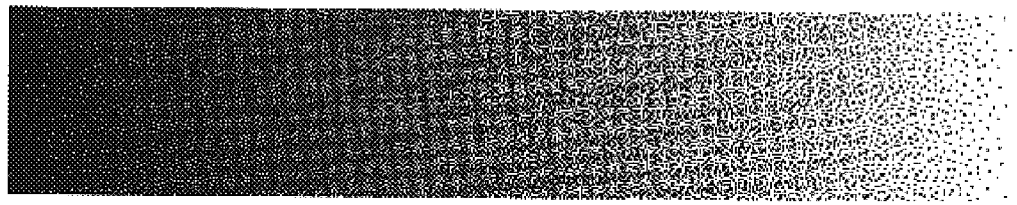
FIGS. 7a, 7b, 7c (collectively, FIG. 7) are illustrations of varying print effects resulting from printing using different types of printer.
Figure 7B:
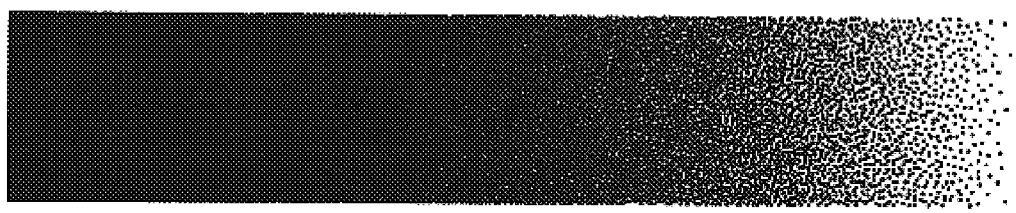
Figure 7C:

These effects are shown in FIGS. 7*a*, 7*b*, 7*c*. The halftone pattern used to produce FIGS. 7*a*, 7*b*, 7*c* is identical to that of FIG. 5, but the black to white wedge in FIG. 7*a* is reproduced with simulated ideal (non-overlapping, square, unity area) spots, the wedge in FIG. 7*b* is the same pattern where each spot is printed as a simulated disk of diameter twice the step size, and the wedge in FIG. 7*c* is printed at a relative scale comparable to the native resolution of the printer to illustrate that the "disk" printer model is a reasonably accurate prediction of true printed textures.

With the disk model, all shades are rendered darker than they should be and isolated white ("unprinted") spots in the shadows are completely filled in by the overlap of surrounding black spots. These tonal distortions can be corrected by an appropriate look-up-table. The more serious problem, however, is the increase in low frequency noise. Many midtone shades include pockets of on-off-on checkerboard texture which print as clumps of black.

The process of convolving the halftone pattern (where "spot" locations would be ideally indicated by delta functions) with the printer's real-world impulse response (a disk, in this model) results in a multiplication of the stochastic pattern Fourier transform by the transform of the printer spot, effectively band limiting the spectrum of the final printed output to that of the spot.

Figure 8:
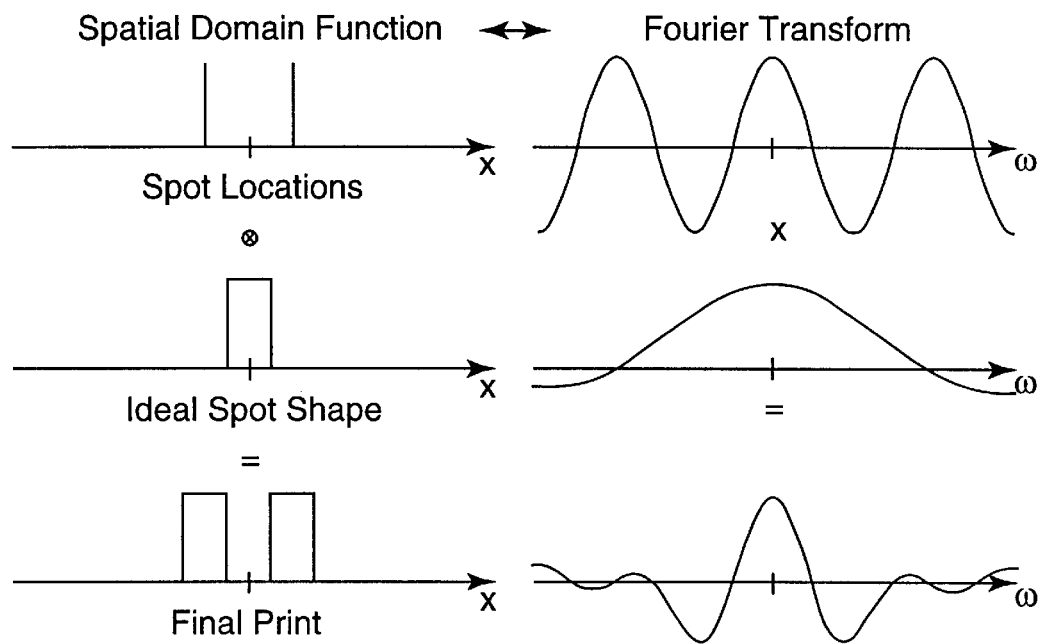
FIG. 8 illustrates an ideal print location and spectrum.

Calculating the resultant spectrum, however, is complicated by a non linear saturation or clipping process in regions where printed spots overlap. A simple illustration of the effect of clipping is shown in FIG. 8. In FIG. 8, an on-off-on spot sequence is printed with ideal spots where the "spot location function" (a pair of delta functions shown in the top line in the figure) has been convolved with the ideal printer spot impulse response (a rectangular pulse). The transform of the final print is then the product of the spot location transform (a simple cosine) and the spot impulse response transform, which is an appropriate sinc function, such as:

$$\mathrm{sinc}(x) = \frac{\sin(\pi x)}{\pi x}.$$

Figure 9:
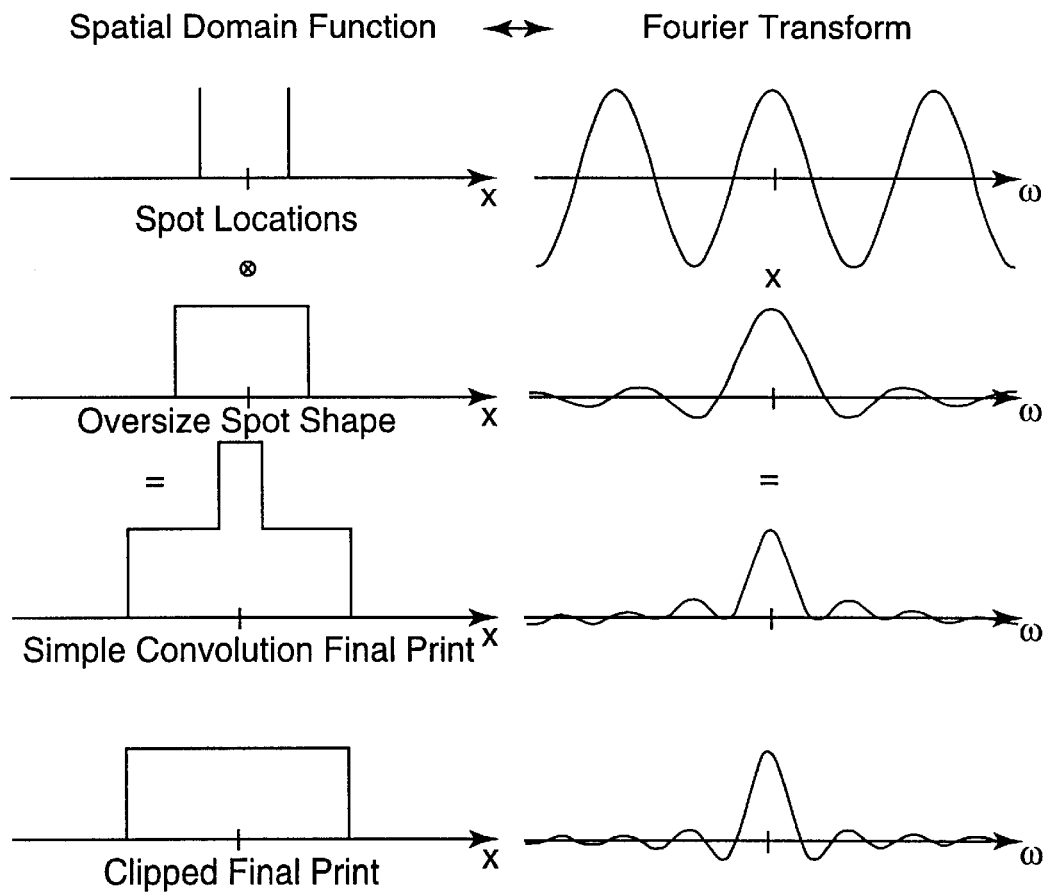
FIG. 9 illustrates a real-world print location and spectrum.

FIG. 9 shows the effect of printing the same on-off-on sequence with an oversize spot. The formal convolution process produces a central, double-height region where the spots overlap. The "final" print is then shown in two versions, the simple convolution result, and the effect when clipping is imposed (where it is assumed that overlapping spots have the same $d_{max}$ as single spots). The net effect is that there is relatively more low frequency power than in the ideal spot size case (FIG. 8). The change in the Fourier transform is easy to calculate in this particular example, but the general case has no simple solution. See E. Steinberg, R. Rolleston and R. Easton, "Analysis of Random Dithering Patterns Using Second-order Statistics", J. Electron. Imag. 1(4), pp. 396–404 (October 1992); M. Broja and O. Bryngdahl, "Quantization of Noise in Electronic Halftoning", J. Opt. Soc. Am. A 10(4) pp. 554–560 (April 1993). It is sufficient to note that the spectra of halftones printed with "real" [oversize] spots is considerably reduced from the ideal case. The larger the printed spot, the greater the spectral reduction.

The shape and size of a printer's spot are very important in determining the spectrum of any printed image, basically imposing an overall envelope that scales the "ideal" image spectrum. Clipping or media saturation effects result in complex, but relatively minor spectral changes. In contrast, the re-normalization of spectral energy distribution after convolution with the printer impulse response causes spectra that have significant energy at frequencies higher than the effective cut off imposed by the printer spot, showing much more change than those with most of the spectral energy initially within the passband of the printer. This change is an undesirable increase in the low frequency (most visible) portion of the halftone spectrum (as was shown in FIG. 7).

It will be useful to examine the full two-dimensional Fourier transform of stochastic threshold matrices, particularly since directional anisotropies will be introduced shortly. The format for many of the examples that follow will be a 256×256 element threshold matrix treated as a continuous tone image in the top left (a) position, a bitmap showing the halftone pattern corresponding to a 25% tint in the upper right (b) position, the magnitude of the Fourier transform of the threshold matrix in the lower left (c), and a graph of the radial average of the Fourier transform in the lower right (d).

FIGS. 10(*a*–*d*) is a display of the unrestricted stochastic threshold matrix used to produce the halftone patterns of FIG. 5.

Figure 10A:
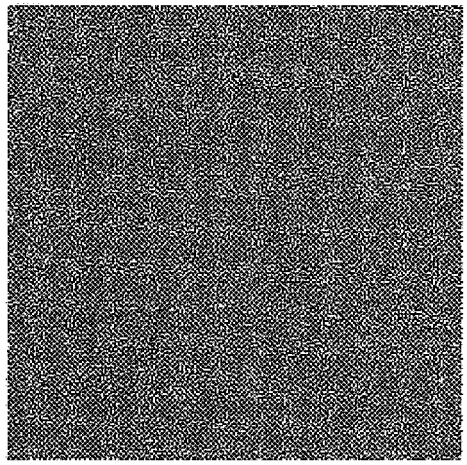
Figure 10B:
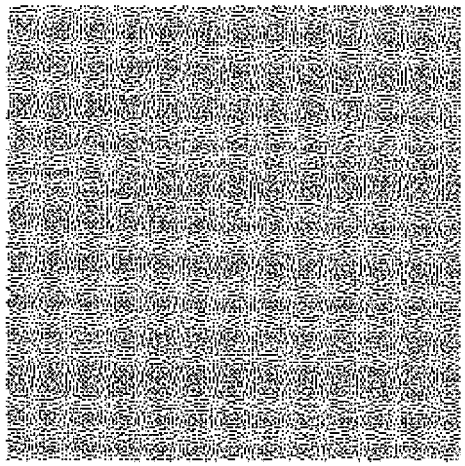
Figure 10B:
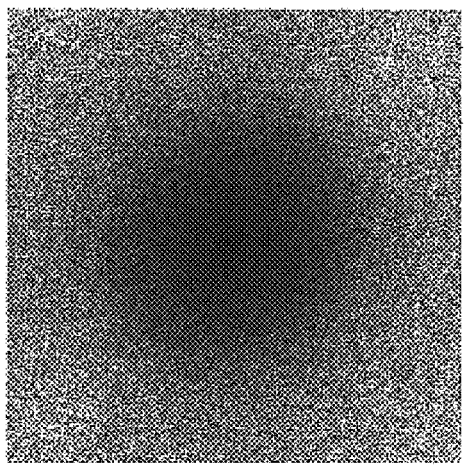
Figure 10B:
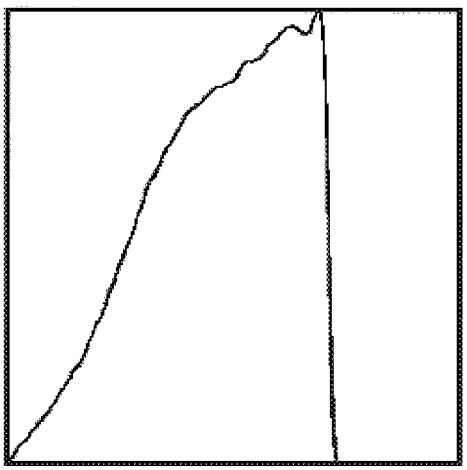

The origin (zero spatial frequency or "DC" term) is centered in the transform image in FIG. 10*c* and the brightness of the image corresponds to the magnitude of the transform. The transform is that of the fill continuous tone threshold matrix so no distinct characteristic frequency appears. The transform of the bitmap produced by a particular threshold (shade) level would show a bright ring corresponding to the peak in the graphs of FIG. 6. This image is effectively a superposition of the transforms for all shades and the continuum of characteristic frequencies results in a sea of high frequency noise.

Figure 11A:
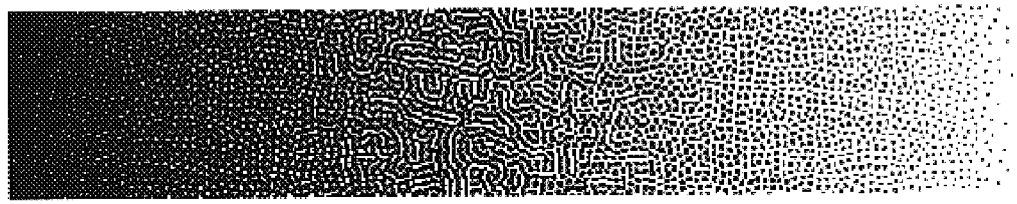
FIGS. 11a, 11b, 11c (collectively, FIG. 11) are an illustration similar to FIG. 7, for a halftone pattern according the present invention.
Figure 11B:
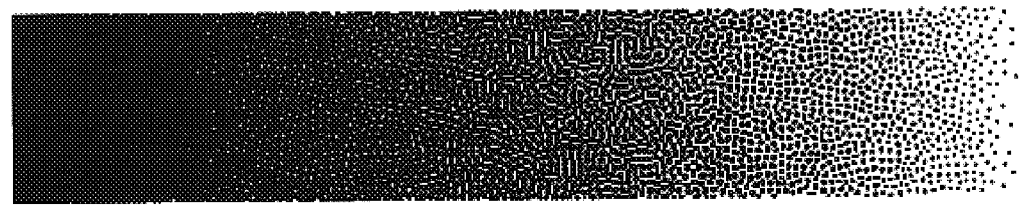
Figure 11C:

An exaggerated example of a narrow band stochastic halftone pattern according to the present invention is shown in FIGS. 11*a*, 11*b*, 11*c*, where "a" has been set to 1.5, giving a mean dot-to-dot distance, $\bar{d}$, of 3.89. The three wedges are reproduced as in FIGS. 7*a*, 7*b*, 7*c* with the black to white wedge of FIG. 11*a* using ideal (non-overlapping, square, unity area) spots, the wedge of FIG. 11*b* is the same pattern where each spot is printed as a disk of diameter twice the raster step size, and the wedge of FIG. 11*c* is printed at a relative scale corresponding to the native resolution of the printer. As can be seen by comparing FIGS. 11 and 7, the texture is much more consistent with a pattern according to the present invention than with the unrestricted stochastic halftone of FIG. 7, and the dot gain is much less.

Figure 12:
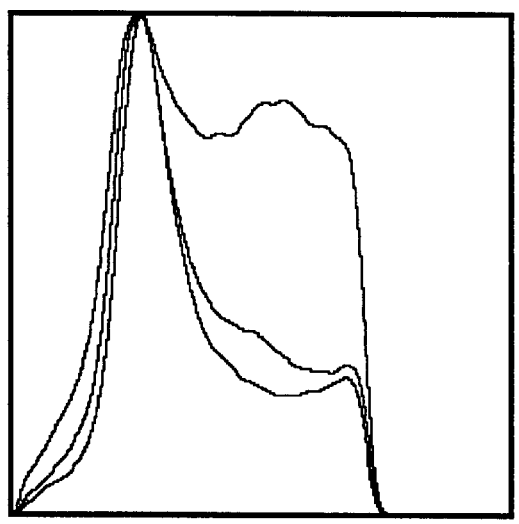
FIG. 12 is a graph similar to FIG. 6, of measured spectra of the pattern of FIG. 11.
Figure 13A:
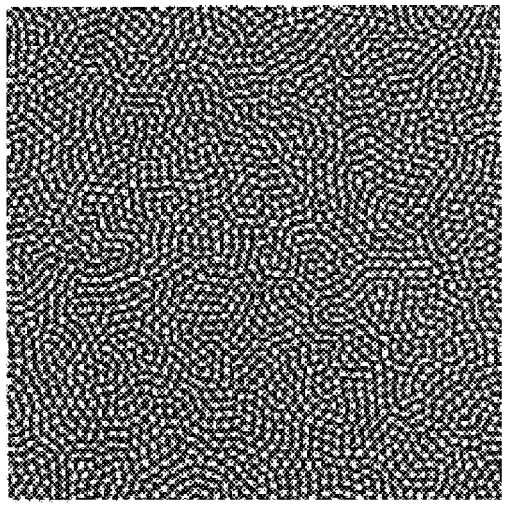
FIGS. 13a, 13b, 13c, 13d (collectively, FIG. 13) are an illustration similar to FIG. 10, for the halftone pattern of FIG. 11.
Figure 13B:
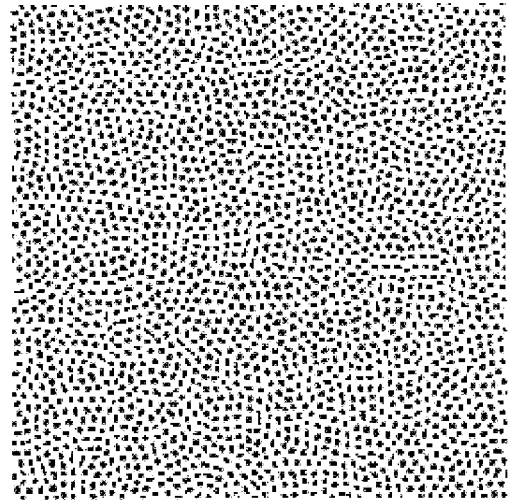
Figure 13C:
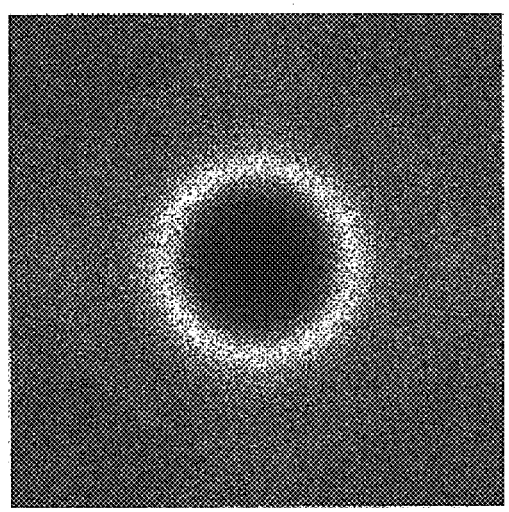
Figure 13D:
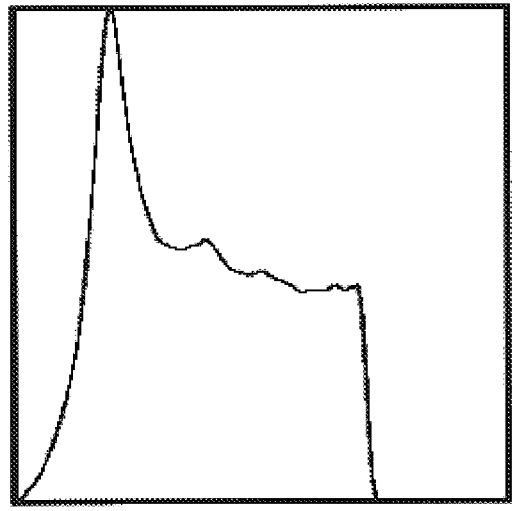
Figure 15A:
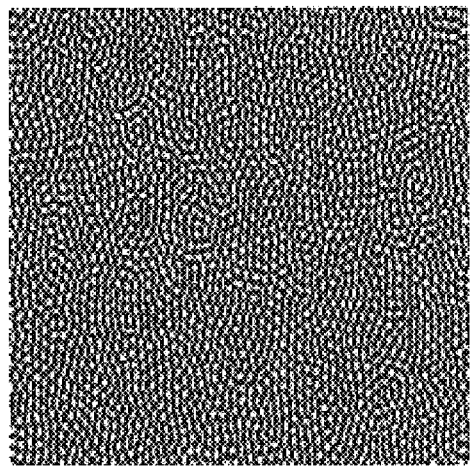
FIGS. 15a, 15b, 15c, 15d (collectively, FIG. 15) are an illustration similar to FIG. 10, for the halftone pattern of FIG. 11 with anistropy added.
Figure 15B:
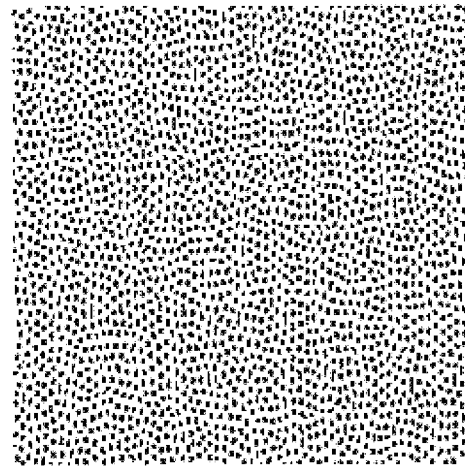
Figure 15C:
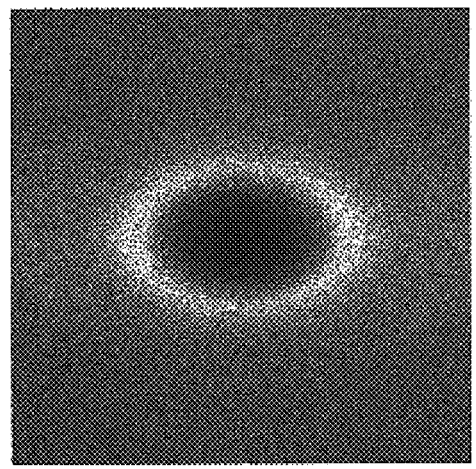
Figure 15D:
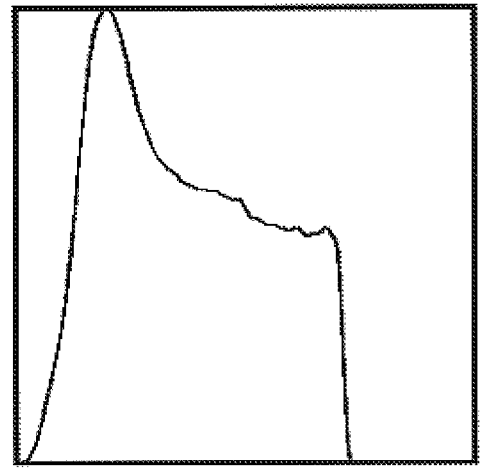

The measured spectra for a few sample shades of the narrow band stochastic halftone pattern of FIG. 11 are shown in FIG. 12. The highlight spectrum (upper most graph) is very similar to that of the unrestricted stochastic halftone (see FIG. 6), since the halftone texture is governed by the repulsive nature of the potential. Unlike the unrestricted stochastic halftone, however, the characteristic peak frequency does not increase as shades darken, rather the characteristic peak narrows as the dot/hole pattern approaches a 50% duty factor.

FIG. 13 is a representation similar to FIG. 10, for the pattern according to the present invention shown in FIG. 11. In this case, the characteristic frequency remains constant for most of the midtone shades (see FIG. 12) resulting in most of the spectral energy being concentrated in a ring corresponding to that spatial frequency, as best seen in FIG. 13c. For both the unrestricted and narrow band stochastic spectra, there is very little low frequency energy (the threshold matrix itself does not include changes that will happen when printing with non-ideal spots). The narrow band spectrum, however, has relatively less very high frequency energy so that its character need not change when re-normalized after convolution with a non-ideal printer spot, as can be seen by comparing FIG. 13d with FIG. 10d.

With the narrow band stochastic mask according to the present invention, the characteristic frequency peak (see FIG. 4) does not move to higher spatial frequencies as shade values approach a middle gray, but remains fixed at the reciprocal of $\bar{d}$. If the parameter a (determining u, in turn controlling $\bar{d}$) is chosen so that this spectral peak stays within the passband of a printer, convolution of the halftone pattern with the printer's spot will cause little change to the spectrum, minimizing the increase in visible low frequency noise.

The spectra above for both the unrestricted and narrow band stochastic patterns are isotropic showing no orientation dependence. There are several reasons it may be desirable to intentionally add anisotropy to halftones. Classic monochrome halftones take advantage of the fact that the human visual system is less sensitive to patterns at 45° than those oriented horizontally or vertically and this can be exploited in stochastic screens as well. The printer may produce an elliptical or rectangular spot making its passband and gain characteristics anisotropic. The primary motivation, however, is to provide more effective de-coupling of multiple screens used in color printing.

Stochastic halftone screens, being aperiodic, have continuous spectra rather than the discrete [line] spectra of conventional halftone screens with well defined dot frequency and angle. Because the spectral energy is so dispersed, stochastic halftone patterns do not suffer from classic moiré effects (i.e., exhibit regular interference beats) when superimposed. A similar "heterodyning" process occurs when continuous distributions are mixed, but the result is an increase in the continuum of low spatial frequency noise rather than the appearance of specific, discrete sum and difference frequencies.

Consider the combination of black and cyan halftone separations. The cyan appears "black" to the red light component so that when these two screens are overprinted, their red transmissions are effectively multiplied. The Fourier transform of the combination is then the convolution of the individual separation transforms. Where there is significant overlap in the power spectra distributions, the convolution produces a low frequency noise distribution.

FIG. 14 shows the result of overprinting two ("black" and "cyan") unconstrained stochastic halftone patterns that have the same statistical properties (i.e., have similar spectra—that shown in FIG. 10), but are otherwise uncorrelated. Samples of the two threshold matrices are shown on the left in FIGS. 14a, 14b, verifying that individually the textures are very smooth. The full 256×256 superposition (product) of the matrices is in the center in FIG. 14c, illustrating the low frequency mottle that results from mixing the high frequency noise components. A graph of the radial average of the Fourier transform on the right in FIG. 14d shows the significant increase in low frequency noise (the left-most portion of the graph).

The spectrum of the superimposed threshold matrices still emphasizes very high spatial frequencies so that the printing process (band limiting by the printer's spot and subsequent re-normalization of the spectrum) will further increase the visible low frequency noise.

The mottle may be reduced by minimizing the spectral energy at very high frequencies (a narrow band pattern, as described earlier) and minimizing the spectral overlap of halftones to be superimposed. One possibility to de-couple narrow band spectra is to choose different characteristic frequencies for the various separations. This has disadvantages, though, in that dot gain will be color dependent (and though it may be compensated for, the compensation will not be particularly robust with changing printing conditions) and some colors must have more visible textures.

A much better approach to de-coupling stochastic halftone spectra is to introduce directional anisotropy. This can be easily done in the present "accumulated bias" method of threshold matrix generation by making the bias contribution itself anisotropic. The variable d in the potential (bias) function f(d) was previously taken to be just a simple radial distance, but the coordinate system may be transformed to make this "distance" calculation dependent on angle. The circular ring corresponding to the characteristic frequency in the spectrum of FIG. 13 may be made elliptical by simply applying a different scale factor to the x and y displacements (for example, multiply x by "s" and y by the reciprocal "1/s" where s is a number close to 1) in calculating a distance argument:

$$d=\sqrt{(s*x)^2+(y/s)^2}.$$

FIG. 15 shows the result of adding this x/y anisotropy. The mean dot-to-dot distance in this example is less in the x direction than the y direction, making the characteristic frequency in the x direction greater than that in the y direction, and giving a slightly elongated appearance to the halftone texture. While anisotropic, the texture is still homogeneous (spatially uniform). The figure has the full continuous tone threshold matrix in FIG. 15a, the bitmap corresponding to a 25% tint in FIG. 15b, the Fourier transform in FIG. 15c, and a graph of the radial average of the transform in FIG. 15d. Even though the transform is no longer circularly symmetric, the radial average is shown for comparison with previous similar figures. The eccentricity of the ellipse seen in FIG. 15c is fairly moderate in this example, so the main effect is a broadening of the radially averaged characteristic frequency peak in FIG. 15d compared to that of the isotropic narrow band pattern in FIG. 13.

Superimposing this narrow band, anisotropic stochastic pattern with a similar pattern of reciprocal eccentricity produces a net texture with much less low frequency noise or mottle. This is shown FIG. 16, which can be compared to the previous unconstrained stochastic example in FIG. 14. Note that for the superimposed anisotropic patterns the low frequency noise (mottle) is considerably reduced and the very high frequency spectral energy is less, which minimizes dot gain and the increase of low frequency noise due to printer resolution limitations.

Accommodating multiple screens (color separations) requires additional orientations of the "spectral ellipse". This is done by using a more general rotation transformation of the x and y coordinates used to calculate the distance argument d in the bias function. The transformation can also directly incorporate the desired differential scale factors (controlling the eccentricity of the ellipse). An example is shown in FIG. 17, in which FIGS. 17a, 17b, 17c corresponds to the a, b, c, figures discussed above.

The freedom to arbitrarily change the eccentricity and angle of the characteristic frequency ellipse makes it easy to overprint virtually any number of color separations (for example, "Hex-Color", or "Hi-Fi Color" images) with minimum color mottle. The de-coupling is also an advantage when overlaying multiple prints to increase density in back-lit images.

Figure 18A:
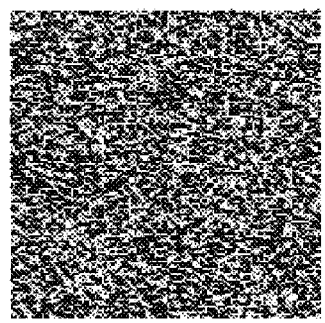
FIGS. 18a, 18b, 18c (collectively FIG. 18) are an illustration similar to FIG. 10, for the halftone pattern of FIG. 5 with anistropy added.
Figure 18B:
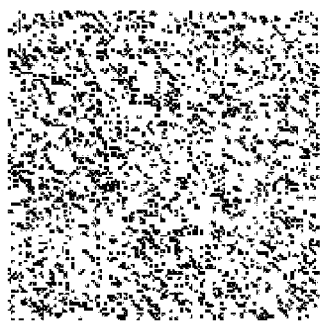
Figure 18C:
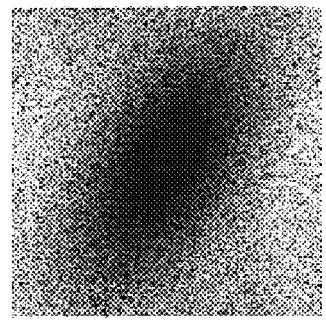

Anisotropy also may be added to the "unconstrained" stochastic patterns by making the distance calculation used in the inverse square bias value formula angularly dependent, as was done for the far-range repulsive, short-range attractive potential of the narrow band case. The portion of the low frequency mottle due to "heterodyning" of coincident spectral distributions will be reduced, but the low frequency noise increase due to spectral energy outside the passband of the printer will still be a problem (as will dot gain). An example of an anisotropic unconstrained stochastic pattern is shown in FIG. 18 (compare to FIG. 10), in which FIGS. 18a, 18b, 18c corresponds to the a, b, c figures discussed above.

In usual practice, a threshold matrix will be created for each printer. That matrix then will be incorporated into a printer driver or other software controlling the printer or display. To use the matrix, the computer doing the printing or displaying will, if necessary, first digitize the image to be printed (e.g., by scanning). The value in each pixel of the image will then be compared to the threshold value in the corresponding element of the threshold matrix (with the matrix replicated as needed to generated a large enough mask to have an element corresponding to each pixel in the image). If the pixel value is greater than the threshold value, the pixel is set to unity (1) or zero (0), depending on the configuration of the specific display or printer. If the pixel value is lower than the threshold value, the pixel is set to the opposite value (zero (0) or unity (1)). If the pixel value matches the threshold value, the computer can either arbitrarily set the value to zero or unity on a case by case basis, or consistently set it one way or the other on some other basis (e.g., all ones, all zeros, or alternating). The resulting ones and zeros then set the halftone pattern for the actual display or print.

As will be apparent, a new type of stochastic halftone, has been developed that offers several improvements over current masks or screens. Spectral energy is concentrated at a well defined characteristic frequency which may be modified to optimize texture visibility and dot gain for specific displays and printers. The spectrum is continuous (there is no well defined screen angle) minimizing potential moiré problems in images with periodic structures, but a directional bias or anisotropy may be added to provide a mechanism for spectral de-coupling of superimposed screens necessary in multicolor printing (reducing low frequency color mottle).

It will be understood that these exemplary embodiments in no way limit the scope of the invention. Other modifications of the invention will be apparent to those skilled in the art in view of the foregoing description. For example, every value described herein as a one or a zero could be replaced by its opposite in a properly configured system. The values of the set of threshold values are largely arbitrary, and could be set to a different set of values if desired. The detailed description starts with the lowest ranking and works to the highest, but an alternate order could be used. These descriptions therefore are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered.

I claim:

1. A method of using a halftone threshold matrix, comprising:
   a) creating a halftone threshold matrix mask comprising the steps of:
      1) define a threshold matrix comprising a plurality of elements;
      2) arbitrarily select a first one of the elements and assign it the lowest or highest ranked threshold value for the matrix;
      3) select a next one of the elements by identifying the element having the minimum accumulated bias relative to all other elements previously selected, where the minimum accumulated bias is determined according to a formula which limits the minimum mean dot-to-dot spacing before existing dots start to grow, and assign such next element the next lowest or highest ranked threshold value for the matrix;
      4) repeat step (c) until all elements have been assigned a threshold value, thereby generating a matrix of elements, each having an assigned value, which matrix can serve as a halftone mask screen pattern,
   b) providing an image engine for which a threshold matrix has been prepared;
   c) providing an image to be imaged on the image engine;
   d) dividing the image into pixels;
   e) comparing the value of each pixel to the threshold value in a corresponding element in the threshold matrix;
   f) if the threshold value is greater than the value of the pixel, setting the bitmap value for pixel to a value selected from the group consisting of 1 or 0;
   g) if the threshold value is less than the value of the pixel, setting the bitmap value for pixel to the other value in the group consisting of 1 or 0;
   h) repeating steps (d) to (f) for each pixel in the image;
   i) providing the thus-determined bitmap values to the image engine to generate an image.

2. The method of claim 1, wherein the imaging engine is selected from the group consisting of printers and display screens.

* * * * *

UNITED STATES PATENT AND TRADEMARK OFFICE
CERTIFICATE OF CORRECTION

PATENT NO. : 6,813,044 B2
DATED : November 2, 2004
INVENTOR(S) : Rylander, Richard L.

It is certified that error appears in the above-identified patent and that said Letters Patent is hereby corrected as shown below:

Column 6,
Lines 24, 29 and 33, delete "anistropy" and insert -- anisotropy --, therefor.

Column 9,
Lines 37-40, after "$a = \dfrac{u^4}{3 - 2\sqrt{2}}$" insert -- . --.

Column 11,
Line 10, delete "addressibility" and insert -- addressability --, therefor.

Column 12,
Line 39, "fill" and insert -- full --, therefor.

Signed and Sealed this

Twelfth Day of April, 2005

JON W. DUDAS
*Director of the United States Patent and Trademark Office*